United States Patent
Baumgardner et al.

[19]

[11] Patent Number: 6,116,278

[45] Date of Patent: Sep. 12, 2000

[54] LOCKOUT VALVE

[75] Inventors: Gary O. Baumgardner, Hickory Corners; John F. Berninger, Kalamazoo; Dale R. Vote, Allegan, all of Mich.

[73] Assignee: Parker-Hannifin Corporation, Cleveland, Ohio

[21] Appl. No.: 09/014,469

[22] Filed: Jan. 28, 1998

Related U.S. Application Data

[60] Provisional application No. 60/001,795, Aug. 2, 1995.

[51] Int. Cl.⁷ ..................................................... E03B 31/00
[52] U.S. Cl. ............... 137/625.25; 137/383; 137/630.17; 251/108; 251/206
[58] Field of Search ............................. 137/383, 625.25, 137/629, 630.16, 630.17; 251/93, 107, 108, 206, 210, 319, 326

[56] References Cited

U.S. PATENT DOCUMENTS

| | | | |
|---|---|---|---|
| 587,099 | 7/1897 | Levi | 251/108 X |
| 1,529,178 | 3/1925 | Greenwood | 137/625.25 |
| 1,679,219 | 7/1928 | Huff | 251/206 X |
| 2,780,232 | 2/1957 | Ney | 251/206 X |
| 2,828,146 | 3/1958 | Abbey | 251/319 X |
| 3,324,888 | 6/1967 | Henderson . | |
| 3,640,303 | 2/1972 | Verheul | 251/326 X |
| 3,780,982 | 12/1973 | Kemp . | |
| 4,089,506 | 5/1978 | Blake | 251/326 X |
| 4,340,203 | 7/1982 | Donner . | |
| 4,354,663 | 10/1982 | Vanderburg et al. . | |
| 4,524,951 | 6/1985 | Green et al. | 137/625.25 X |
| 4,705,073 | 11/1987 | Beck | 137/625.25 |
| 4,962,785 | 10/1990 | Clifford | 137/383 |
| 5,370,149 | 12/1994 | Clarkson et al. . | |

FOREIGN PATENT DOCUMENTS

| | | |
|---|---|---|
| 2214644 | 10/1973 | Germany . |
| 8606140 U | 2/1988 | Germany . |
| 2168463 | 6/1986 | United Kingdom . |

OTHER PUBLICATIONS

Two (2) catalog sheets of Norgren Catalog Copyright Date 1994.

*Primary Examiner*—John Rivell
*Attorney, Agent, or Firm*—Christopher H. Hunter

[57] ABSTRACT

A lockout valve comprises a body with an inlet passage and an outlet passage which define a longitudinally-extending flow path through the body. A flow interrupter device, or slide, is mounted for transverse movement within the body. The slide can be located in a closed position, whereby fluid is prevented from flowing from the inlet passage to the outlet passage, but fluid downstream of the lockout valve is allowed to vent to atmosphere; to an intermediate bleed position, whereby restricted fluid flow is allowed from the inlet passage to the outlet passage through a bleed aperture; and to a fully open position whereby fluid is allowed to flow substantially unimpeded through a flow aperture from the inlet passage to the outlet passage. A latch normally prevents the slide from moving from the bleed position to the open position while fluid pressure rises across the lockout valve. The latch can be manually manipulated to allow the slide to be moved to the open position.

31 Claims, 3 Drawing Sheets

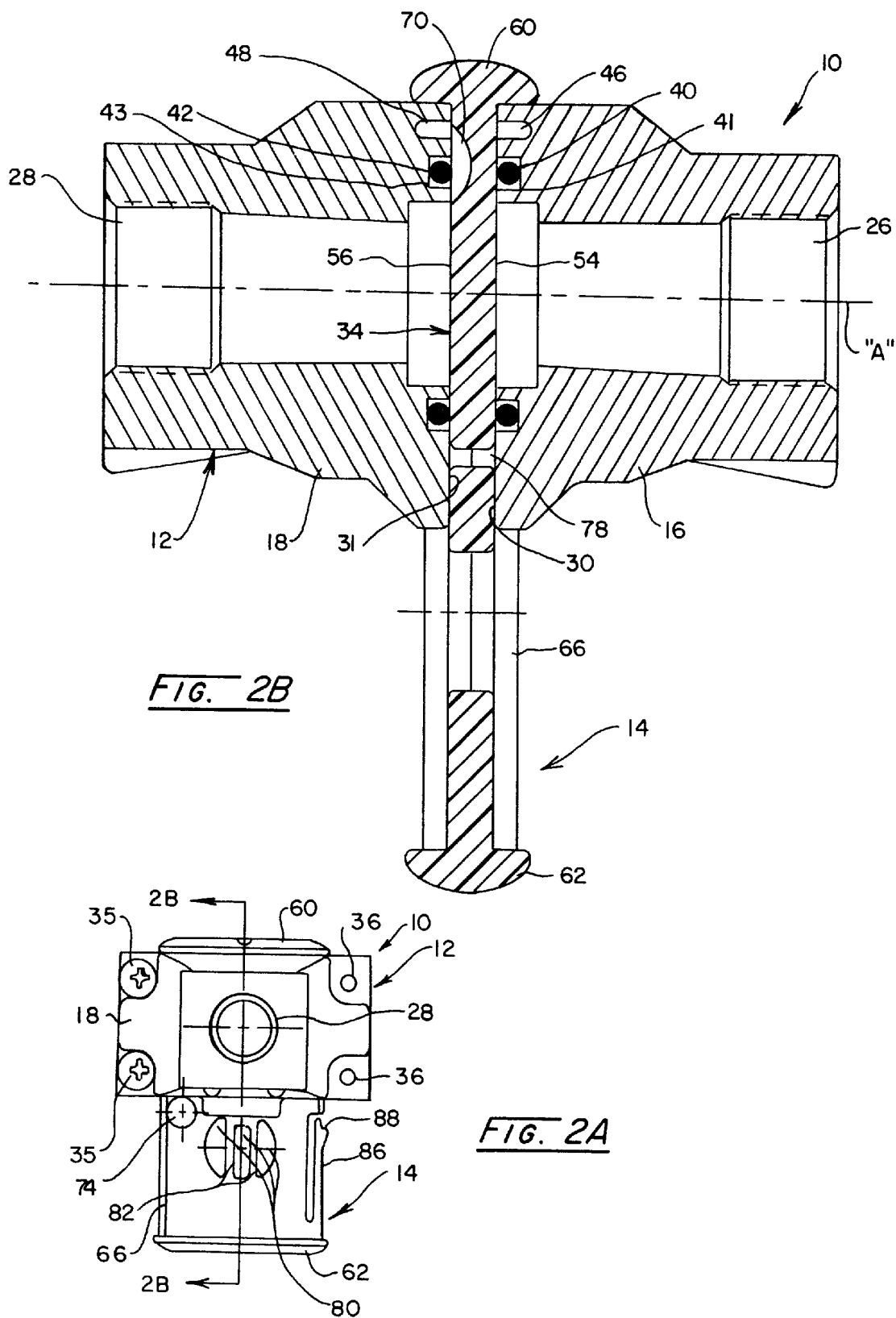

LOCKOUT VALVE

CROSS REFERENCE TO RELATED APPLICATION

This application claims priority to U.S. Provisional application Ser. No. 60/001,795, filed Aug. 2, 1995.

FIELD OF THE INVENTION

The present invention relates generally to valves which control the flow of fluid through a system, and more particularly to a lockout valve which controls the flow of pressurized air to air-operated equipment.

BACKGROUND OF THE INVENTION

Lockout valves are known for controlling the flow of fluid, for example pressurized air, in a fluid system. The lockout valves are used in maintenance and service procedures of air-operated equipment in the system. Prior to servicing, a handle or slide on the body of the valve is moved to a closed position, blocking upstream air pressure. At the same time, downstream air pressure is relieved to allow maintenance to the equipment. A padlock can be installed on the valve to deter unauthorized actuation during the maintenance procedure. Following maintenance, the padlock is removed and the handle or slide is moved to an open position, returning air pressure to the system.

One type of lockout valve is offered by the assignee of the present invention under the model/designation "LV" Series Lockout Valve. The lockout valve is typically installed in pneumatic drop legs or individual pneumatic control lines with, for example, a filter, regulator and lubricator. In this type of valve, a handle attached to a cylindrical rod can be grasped and moved between an open and closed position. The cylindrical rod includes circumferential channels which allow air to flow through the valve when it is open, but which are sealed off to prevent air flow through the valve when the valve is closed. A padlock can be inserted through an opening in the valve body and into a groove formed in the handle when the valve is in the closed position. While this lockout valve operates satisfactorily in most conditions, it can be bulky and relatively expensive for certain applications, and contains an arrangement of components which can be time-consuming and complicated to manufacture. Moreover, as the handle is moved from a closed position to an open position, pressurized air enters the system relatively rapidly, which can adversely affect certain equipment in the system, for example cylinders with attached loads.

Patent Specification U.S. Pat. No. 3,780,982 show a gate valve structure having a slab gate with a fully closed position, a second position where small diameter holes provide bleed flow, and a fully opened position, depending upon the rotation of a hand wheel controlling the movement of the valve. While the gate valve structure shown in this reference may be appropriate for certain applications, the valve can be moved to its fully opened position before the pressure is equalized across the valve. Again, equipment in the system can be adversely affected by a rapid increase in pressure.

As such, it is believed that there is a demand in the industry for a lockout valve which is relatively simple in construction and manufacture, and which provides a gradual build-up of pressure across the lockout valve when opened to protect equipment in the system.

SUMMARY OF THE INVENTION

The present invention provides a lockout valve which has a body and a flow interrupter device, or slide, which is mounted for transverse movement within the body. The slide has a closed position to block fluid flow through the body, an intermediate position which allows fluid pressure to bleed across the valve when the slide is moved from the closed position to the intermediate position, and an open position which allows fluid flow substantially unimpeded through the body. The lockout valve is simple in construction and manufacture, and protects equipment in the fluid system from rapid increases in pressure when the valve is opened.

According to the principles of the present invention, the body of the lockout valve preferably comprises two identical body members which are fastened together to define an internal chamber. An inlet passage is provided in one body member to the chamber, and an outlet passage is provided in the other body member to the chamber. The inlet and outlet passages together define a flow path longitudinally through the body. Each body member carries an O-ring seal in a channel formed in the inside surface of the body member. The seals surround the openings from the inlet and outlet passages in the body to the internal chamber.

The flow interrupter device, or slide, is disposed within the chamber in the body. The seals carried by the body members seal against the opposite surfaces of the slide around the inlet and outlet passages. The slide comprises a flat blank of material which is mounted for transverse movement with respect to the valve body. The slide has upper and lower flanges extending perpendicular to the axis of the blank which limit the movement of the slide in the valve body. A rib also extends axially along one side edge of the slide between the top flange and the bottom flange for strength and to direct the slide through the valve body.

The first, closed position of the slide is when the slide is moved downwardly until the upper flange contacts the upper surface of the valve. In this position, fluid is blocked from passing from the inlet passage to the outlet passage. However, outlet fluid from the downstream system is allowed to vent through the valve to atmosphere through venting grooves provided on the downstream surface of the slide. The venting grooves are arranged toward one end of the slide in an arcuate arrangement having the same radius of curvature as the downstream seal within the valve body. When the slide is in the closed position, the grooves allow downstream fluid in the outer passage to bypass, i.e., flow around the downstream seal and vent to atmosphere. When the slide is in its closed position, a locking aperture is accessible for receiving a padlock to deter operation of the slide during maintenance of the system.

The second, bleed position of the valve is when the slide is moved to its intermediate point within the valve body. In this position, restricted fluid flow is allowed from the inlet passage to the outlet passage through one or more relatively small bleed holes formed centrally in the slide. The slide is maintained in this position until fluid pressure increases across the lockout valve for normal system operation.

Finally, in the third, open position, the slide is moved upwardly until the lower flange on the slide contacts the lower surface of the valve body. In this position, fluid is allowed to flow through the body of the valve substantially unimpeded. An aperture having substantially the same diameter as the inlet and outlet passages is formed in the slide. When the slide is in the open position, the aperture is aligned with the inlet and outlet passages of the valve body. Ribs can extend in a chord-like manner across the aperture to prevent seal extrusion through the aperture when the slide is shifted.

According to an important, additional aspect of the present invention, a latch is provided on the slide. The latch normally prevents movement of the slide from the bleed position to the open position, and thereby allows fluid pressure across the valve to equalize before the valve is fully opened. The latch can be manually manipulated by the operator such that the slide can be moved to its open position after the pressure is equalized. Preferably, the latch comprises a spring finger which extends along a side edge of the slide and engages a portion of the valve body until the finger is manually manipulated away from the body.

As described above, the lockout valve of the present invention is relatively simple in construction and manufacture, and has a bleed function which equalizes pressure within the fluid system to protect the equipment in the system.

Further features and advantages of the present invention should become apparent to those skilled in the art upon reviewing the following detailed description and appended drawings.

BRIEF DESCRIPTION OF THE DRAWINGS

FIG. 2A is a front view of the lockout valve of FIG. 1;

FIG. 2B is a cross-sectional view of the lockout valve taken substantially along the plane described by lines 2B—2B of FIG. 2A;

DETAILED DESCRIPTION OF THE PREFERRED EMBODIMENT

Figure 1:
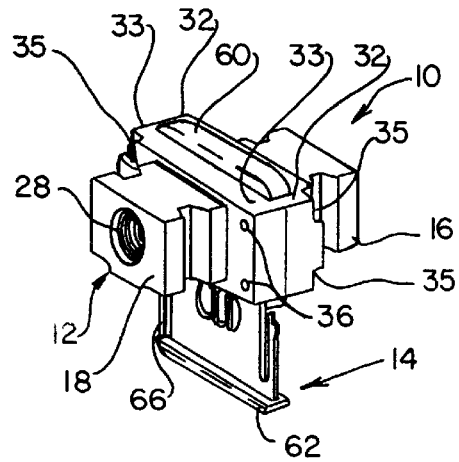
FIG. 1 is a side perspective view of the lockout valve of the present invention, illustrating the lockout valve in a closed position.

Referring to the drawings, and initially to FIGS. 1–4, a lockout valve constructed according to the principles of the present invention is indicated generally at 10. The lockout valve 10 includes a valve body, indicated generally at 12, and a flow interrupter device, or slide, indicated generally at 14. The body 12 preferably includes an inlet body member 16 and an outlet body member 18, which preferably are identical in construction and can therefore be used interchangeably. An inlet passage 26 is formed through inlet body member 16, while an outlet passage 28 is formed through outlet body member 18. The inlet and outlet passages 26, 28 are preferably threaded so as to be connectable within a fluid system. Passages 26, 28 are located along a centerline "A" which extends longitudinally through the body 12.

Inlet body member 16 has an inwardly-facing and transversely-extending flat end surface 30 which is disposed in opposing, parallel, face-to-face relation with an inwardly-facing and transversely-extending flat end surface 31 on outlet body member 18. The flat end surfaces 30, 31 are spaced-apart from each other by flanges 32, 33 respectively (FIGS. 1, 3 and 4) which extend outwardly from each surface along the side edges of each body member. Flanges 32, 33 terminate in flat, transversely-extending surfaces which are in surface-to-surface contact with each other. The space between the flat end surfaces 30, 31 formed by flanges 32, 33 defines a transversely-extending chamber, indicated generally at 34 (FIG. 2B). The inlet and outlet body members are preferably fastened together using conventional fasteners, e.g., self-tapping screws 35, which are received within corresponding bores 36 extending through flanges 32, 33. The body members can be easily positioned and oriented with respect to each other with the aid of a pin on one flange of one body member being received in a hole on the opposing surface of the flange on the other body member. As an example, pin 37 is shown on one flange on body member 18 in FIG. 4, while hole 38 is shown in the other flange of body member 18. A corresponding pin and hole would also be formed in inlet body member 16. Other orientation aids could of course also be used than the pin-and-hole combination described above.

A seal is disposed in a channel formed on the inside surface of each body portion surrounding the respective inlet or outlet passage. Specifically, a first O-ring seal 40 is disposed in a shallow annular channel 41 formed in the inside surface 30 of inlet body member 16 (FIG. 2B) surrounding inlet passage 26, while a second O-ring seal 42 is disposed in a shallow annular channel 43 formed in the inside surface 31 of outlet body member 18 (FIGS. 2B, 3, 4) surrounding outlet passage 28. Each seal 40, 42 is preferably an O-ring type seal and has a cross-sectional dimension which is slightly larger than the cross-sectional dimension of the corresponding annular channel such that each seal is slightly compressed within the channel, and protrudes therefrom uniformly around the inlet and outlet passages. Each seal is conventional in design and manufacture.

Figure 3:
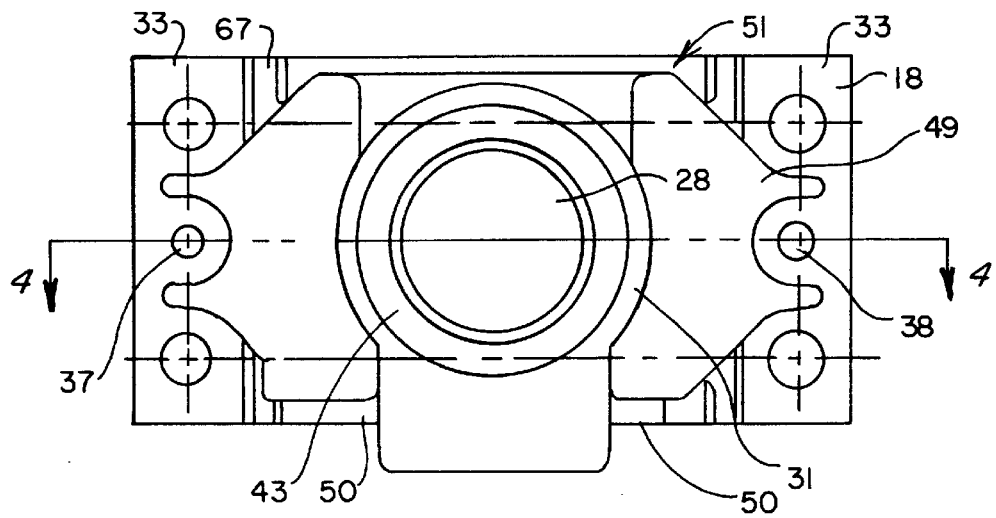
FIG. 3 is an inside view of the outlet body member of the lockout valve of FIG. 1, the inlet body member being identical in construction.
Figure 4:
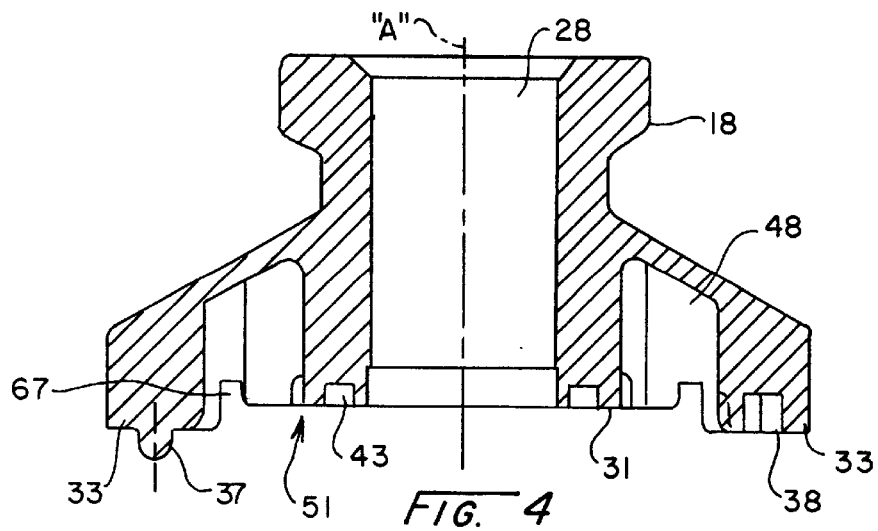
FIG. 4 is a cross-sectional top view of the outlet body member taken substantially along the plane described by the lines 4—4 of FIG. 3.

A vent channel is also formed in the inside surface of each body member. Specifically, a first transversely-extending vent channel 46 is formed in the inside surface 30 of body member 16 (FIG. 2B), while a second transversely-extending vent channel 48 is formed on the inside surface 31 of body member 18 (FIGS. 2B, 3, 4). As can be seen most clearly with vent channel 48 in FIG. 3, each vent channel extends circumferentially around the upper portion of each inlet and outlet passage at radially outward, spaced-apart distances from the seals. Each vent channel communicates with a cavity 49 in body member 18 and is separately open to atmosphere through channels or grooves 50 formed in the lower end of the body.

As indicated previously, the body members are preferably identical in construction and are formed from inexpensive, rigid material. Preferably the body members are formed from metal (e.g., zinc), using conventional metal-forming techniques, e.g., casting, cutting, drilling, stamping, etc. The simple and identical construction of the body members and conventional manufacturing techniques reduces labor and other costs associated with the lockout valve.

The slide 14 for the lockout valve is disposed within the chamber 34 between the body members and extends transversely out through rectangular openings formed in the upper and lower surfaces of the valve body. Half of each rectangular opening, indicated generally at 49, can be seen in FIGS. 3 and 4 and is defined by flanges 33 in body member 18. The other cooperating half of each rectangular opening is defined by flanges 32 in body member 16. Slide 14 is also preferably formed from light-weight, inexpensive, rigid material, and is preferably formed from plastic, using conventional plastic-forming techniques (e.g., molding, stamping, drilling, etc.). Slide 14 preferably comprises a relatively thin blank of material having a flat upstream surface 54 and a flat downstream surface 56. The slide 14 has a flange 60 which extends along the upper edge of the slide and projects outwardly perpendicular to the plane of the slide, and a corresponding flange 62 which extends along the lower edge of the slide and also projects outwardly from either surface perpendicular to the plane of the slide. Upper flange 60 and lower flange 62 are designed to limit the transverse movement of the slide within chamber 34 by engaging the upper and lower surfaces of the body during movement of the slide (compare, e.g., FIGS. 2A and 6A). A support flange or rib 66 extends along one side of the slide and interconnects the upper flange 60 and the lower flange 62. Support flange or rib 66 provides additional rigidity for the slide and is received within a transversely-extending straight channel or groove formed on the inside surface of each body member (e.g., groove 67 shown in FIGS. 3 and 4 for body member 18). The straight channels formed in the body members cooperate to retain flange 66 and thereby direct the transverse movement of the slide. Preferably, the upper stop flange 60, lower stop flange 62 and strengthening flange or rib 66 are formed in one piece with slide 14.

Slide 14 can be selectively movable relative to body 12 into three operating positions. In a first position, illustrated in FIGS. 2A and 2B, the lockout valve is closed and fluid is prevented from flowing from inlet passage 26 to outlet passage 28. The slide 14 is moved in a downward direction such that upper flange 60 contacts the upper surface of body 12 and the solid uninterrupted surface of the upper portion of slide 14 prevents fluid flow. In this position, upstream seal 40 is compressed against the upstream surface 54 of the slide, thereby preventing fluid from escaping from the inlet passage 26 around the upstream surface of the slide to atmosphere. Likewise, downstream seal 42 is also compressed against the downstream surface 56 of the slide. However, fluid downstream of slide 14 is allowed a vent to the atmosphere. To this end, a plurality of cup-shaped venting grooves 70 (see also FIG. 6A) are formed on the downstream surface 56 of the slide 14. The arrangement of grooves 70 follows an arc having substantially the radius of curvature of downstream seal 42. When the slide 14 is in its closed position, channels 70 straddle or bypass downstream seal 42 to allow downstream fluid pressure to be vented into vent channel 48, where the fluid then passes to atmosphere. It is noted that the other vent channel 46 is formed in the inside surface of body member 16, but this vent channel is only a function of the identical nature of the body members, and otherwise is not used.

To maintain the slide 14 in its closed position during maintenance or service of the fluid system, a lock aperture 74 (FIG. 2A) is formed through slide 14. Lock aperture 74 is accessible when the slide is in its closed position and is designed to receive a padlock to deter movement of slide 14.

Figure 5A:
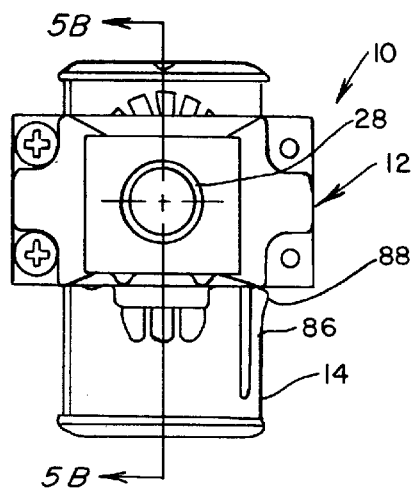
FIG. 5A is a front view of the lockout valve of FIG. 1, illustrating the lockout valve in its bleed position.
Figure 5B:
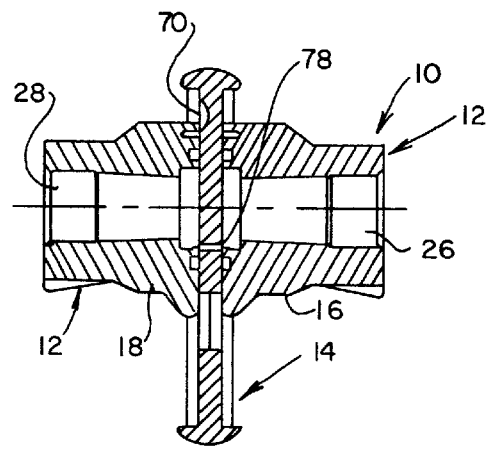
FIG. 5B is a cross-sectional illustration of the lockout valve taken substantially along the plane described by the lines 5B—5B of FIG. 5A.

When it is desired to open the lockout valve, the padlock is removed and the slide is moved to an intermediate, bleed position, illustrated in FIGS. 5A and 5B. In this position, at least one, and preferably three or more bleed holes or passages 78 (see also FIG. 2B) become aligned with inlet passage 26 and outlet passage 28. Bleed passages 78 allow restricted fluid flow from inlet passage 26 to outlet passage 28. The bleed flow between inlet passage 26 and outlet passage 28 is preferably continued until the pressure across the lockout valve is sufficient for normal system operation.

After this, the slide may then be moved to its fully open position. The lockout valve can be provided with some or all of the bleed holes covered, and the end-user can punch out the bleed holes as necessary to bleed air pressure at a desired rate. In the intermediate position, venting channels 70 are moved away from their position straddling downstream seal 42 and hence the venting function described previously is not utilized.

Figure 6A:
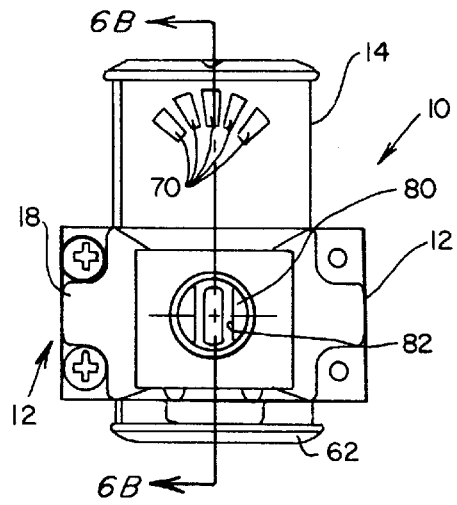
FIG. 6A is a front view of the lockout valve of FIG. 1, illustrating the lockout valve in its open position.
Figure 6B:
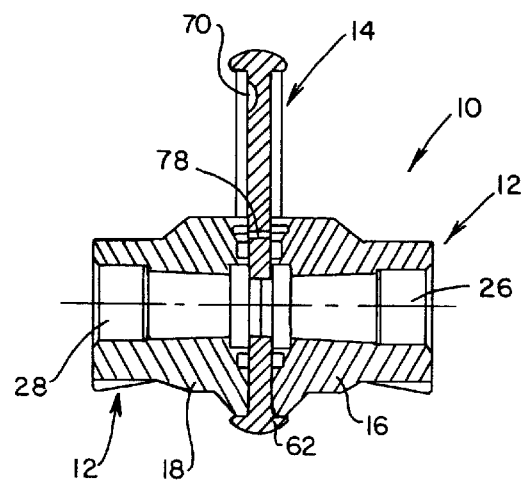
FIG. 6B is a cross-sectional illustration of the lockout valve taken substantially along the plane described by the line 6B—6B of FIG. 6A.

When it is desired to open the lockout valve fully, slide 14 is moved into the position illustrated in FIGS. 6A and 6B, whereby lower flange 62 engages the body 12. In this position, an aperture 80 formed through slide 14 becomes aligned with inlet passage 26 and outlet passage 28. Aperture 80 has substantially the same diameter as inlet passage 26 and outlet passage 28, and substantially unimpeded fluid flow is provided therethrough. Ribs 82 can also be provided and extend in a chord-like manner across aperture 80 to prevent O-ring extrusion when the slide is shifted. Ribs 82 can also be dimensioned to affect the pressure drop across the valve. In the position illustrated in FIGS. 6A and 6B, venting channels 70 and bleed apertures 78 are moved out of alignment with inlet passage 26 and outlet passage 28, and hence are not utilized.

Thus, as described above, slide 14 can be moved from a first, closed position (FIGS. 2A, 2B), whereby fluid is prevented from flowing from the inlet passage 26 to the outlet passage 28; to a second, bleed position (FIGS. 5A, 5B) whereby restricted fluid flow is allowed from inlet passage 26 to outlet passage 28 to thereby allow pressure within the system to gradually increase; to a third, open position (FIGS. 6A, 6B) whereby fluid is allowed to flow substantially unimpeded from inlet passage 26 to outlet passage 28.

To prevent inadvertent movement from the closed position (FIGS. 2A, 2B) to the open position (FIGS. 6A, 6B) without allowing sufficient time for the fluid pressure to rise sufficiently across the lockout valve, a latch, indicated generally at 86 in FIG. 5A, is provided on slide 14. Latch 86 preferably comprises a spring finger which extends along the side of slide 14 and in the same plane as the slide. Latch 86 has an outwardly-projecting flange or shoulder 88 (FIG. 2A) which is normally positioned to engage the body 12 when the slide 14 is moved to its intermediate position (FIG. 5A), and thereby prevent the slide from moving into its fully open position. Spring finger 86 can be manually manipulated, e.g., pressed toward the slide 14, such that flange 88 can slide through the lower opening in body 12 and into chamber 34. Spring finger 86 is also preferably formed in one piece with slide 14.

Thus, as described above, the present invention provides a lockout valve which is formed from relatively few components and which is easy to manufacture, and which provides for a gradual increase in pressure across the lockout valve as the lockout valve is moved from its closed to open position to protect equipment in the fluid system.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows fill fluid flow through a flow aperture in the flow interrupter device substantially unimpeded from the inlet passage to the outlet passage; and a latch device which normally engages said valve body and prevents said flow interrupter device from being moved from said second position to said third position, wherein the flow interrupter device can be manually manipulated to bring the latch device out of engagement with said valve body to allow said flow interrupter device to move from said second position to said third position, and wherein said flow interrupter device further includes a flat slide having opposite ends terminating in stop flanges to limit movement of said flow interrupter device with respect to said valve body, a reinforcement piece extending along one side edge of the flow interrupter device and interconnecting said stop flanges to provide structural reinforcement of said flow interrupter device, and a spring finger forming the latch device extending along another side edge of the flow interrupter device for normally engaging said valve body to prevent said flow interrupter device from moving from said second position to said third position, but which can be manually manipulated away from engagement with said valve body to allow said flow interrupter device to be moved from said second position to said third position.

2. The lockout valve as in claim 1, wherein said flow interrupter device further includes venting structure which vents fluid flow from the outlet passage to ambient when said flow interrupter device is in said first position.

3. The lockout valve as in claim 2, wherein said body carries a pair of O-seals, each of said O-seals bearing against a respective surface of the flow interrupter device and around a respective inlet and outlet passage, and said venting structure includes a plurality of vent channels formed in a surface of said flow interrupter device in a formation generally corresponding to the curvature of the O-seals and which bypass one of said seals on a downstream side of said flow interrupter device to allow downstream pressure in the valve to vent to atmosphere.

4. The lockout valve as in claim 3, wherein said flow interrupter device further includes at least one support rib which extends across the flow aperture to prevent extrusion of said seals through said flow aperture.

5. The lockout valve as in claim 1, wherein said reinforcement piece extends outwardly from at least one surface of the device for strengthening said flow interrupter device and for cooperating with said valve body to control the movement of the flow interrupter device in said valve body.

6. The lockout valve as in claim 1, wherein said inlet and outlet passages are located along a longitudinal axis in said body, and said flat slide is moveable in a transverse direction to the longitudinal axis of the body.

7. The lockout valve as in claim 6, wherein the valve body includes a transversely-extending chamber receiving said slide, and said reinforcement piece extends outwardly from at least one surface of the device and cooperates with said chamber to confine movement of said flow interrupter device along an axis perpendicular to the longitudinal axis of the valve body.

8. The lockout valve as in claim 6, wherein said flow interrupter device further includes a plurality of discretely-spaced channels formed in a downstream surface which fluidly interconnect the outlet passage with the atmosphere where said fluid interrupter device is in said first position.

9. The lockout valve as in claim 1, wherein said latch device is spaced-apart from the other side edge of the flow interrupter device and can be manually manipulated toward the other side edge of the flow interrupter device.

10. The lockout valve as in claim 6, wherein said flow interrupter device further includes a lock aperture extending transversely through the flow interrupter device which is accessible externally from the valve body when said flow interrupter device is in the first position, and which is covered by the valve body when said flow interrupter device is in the second or third position.

11. The lockout valve as in claim 1, wherein the latch device is formed in one piece with the flow interrupter device.

12. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows full fluid flow through a flow aperture in the flow interrupter device substantially unimpeded from the inlet passage to the outlet passage, and said flow interrupter device includes venting structure which vents fluid flow from the outlet passage to ambient when said flow interrupter device is in said first position, and wherein said flow interrupter device further includes a flat slide having opposite ends terminating in stop flanges to limit movement of said flow interrupter device with respect to said valve body, and a reinforcement piece extending along one side edge of the flow interrupter device and interconnecting said stop flanges to provide structural reinforcement of said flow interrupter device, and a spring finger forming a latch device extending along another side edge of the flow interrupter device for normally engaging said valve body to prevent said flow interrupter device from moving from said second position to said third position, but which can be manually manipulated away from engagement with said valve body to allow said flow interrupter device to be moved from said second position to said third position.

13. The lockout valve as in claim 12, wherein said body carries a pair of O-seals, each of said O-seals bearing against a respective surface of the flow interrupter device and around a respective inlet and outlet passage, and said venting structure includes a plurality of vent channels formed in a surface of said flow interrupter device in a formation generally corresponding to the curvature of the O-seals and which bypass one of said seals on a downstream side of said flow interrupter device to allow downstream pressure in the valve to vent to atmosphere.

14. The lockout valve as in claim 13, wherein said flow interrupter device further includes at least one support rib which extends across the flow aperture to prevent extrusion of said seals through said flow aperture.

15. The lockout valve as in claim 12, wherein said inlet and outlet passages are located along a longitudinal axis in said body, and said flat slide is moveable in a transverse direction to the longitudinal axis of the body.

16. The lockout valve as in claim 15, wherein the valve body includes a transversely-extending chamber receiving said slide, and said reinforcement piece extends outwardly from at least one surface of the device and cooperates with said chamber to confine movement of said flow interrupter device along an axis perpendicular to the longitudinal axis of the valve body.

17. The lockout valve as in claim 15, wherein said flow interrupter device further includes a plurality of discretely-spaced channels formed in a downstream surface which fluidly interconnect the outlet passage with the atmosphere where said fluid interrupter device is in said first position.

18. The lockout valve as in claim 15, wherein said flow interrupter device further includes a lock aperture extending transversely through the flow interrupter device which is accessible externally from the valve body when said flow interrupter device is in the first position, and which is covered by the valve body when said flow interrupter device is in the second or third position.

19. A lockout valve, comprising a valve body with an upstream inlet passage and a downstream outlet passage which are fluidly interconnected; a flow interrupter device comprising a flat slide slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows fall fluid flow through a flow aperture in the flow interrupter device substantially unimpeded from the inlet passage to the outlet passage; and said flow interrupter device further includes flanges extending along opposite ends of the device, said flanges cooperating with said valve body for limiting the maximum axial movement of the flow interrupter device within said valve body, a reinforcement piece extending along one side edge of the flow interrupter device and interconnecting said stop flanges to provide structural reinforcement of said flow interrupter device, and a spring finger forming a latch device extending along another side edge of the flow interrupter device for normally engaging said valve body to prevent said flow interrupter device from moving from said second position to said third position, but which can be manually manipulated away from engagement with said valve body to allow said flow interrupter device to be moved from said second position to said third position.

20. The lockout valve as in claim 19, wherein said inlet and outlet passages are located along a longitudinal axis in said body, and said flat slide is moveable in a transverse direction to the longitudinal axis of the body.

21. The lockout valve as in claim 20, wherein the valve body includes a transversely-extending chamber receiving said slide, and said reinforcement piece extends outwardly from at least one surface of the device and cooperates with said chamber to confine movement of said flow interrupter device along an axis perpendicular to the longitudinal axis of the valve body.

22. The lockout valve as in claim 20, wherein said flow interrupter device further includes a plurality of discretely-spaced channels formed in a downstream surface which fluidly interconnect the outlet passage with the atmosphere where said fluid interrupter device is in said first position.

23. The lockout valve as in claim 20, wherein said flow interrupter device further includes a lock aperture extending transversely through the flow interrupter device which is accessible externally from the valve body when said flow interrupter device is in the first position, and which is covered by the valve body when said flow interrupter device is in the second or third position.

24. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows full fluid flow through a flow aperture in the flow interrupter device substantially unimpeded from the inlet passage to the outlet passage; and said flow interrupter device further includes a strengthening rib extending along an edge of the device and extending outwardly from at least one surface of the device for strengthening said device and for cooperating with said valve body for controlling the movement of the device in said valve body, and wherein said flow interrupter device further includes a flat slide having opposite ends terminating in stop flanges to limit movement of said flow interrupter device with respect to said valve body, and a spring finger forming a latch device extending along another side edge of the flow interrupter device for normally engaging said valve body to prevent said flow interrupter device from moving from said second position to said third position, but which can be manually manipulated away from engagement with said valve body to allow said flow interrupter device to be moved from said second position to said third position.

25. The lockout valve as in claim 24, wherein said inlet and outlet passages are located along a longitudinal axis in said body, and said flat slide is moveable in a transverse direction to the longitudinal axis of the body.

26. The lockout valve as in claim 25, wherein said flow interrupter device further includes a plurality of discretely-spaced channels formed in a downstream surface which fluidly interconnect the outlet passage with the atmosphere where said fluid interrupter device is in said first, position.

27. The lockout valve as in claim 25, wherein said flow interrupter device further includes a lock aperture extending transversely through the flow interrupter device which is accessible externally from the valve body when said flow interrupter device is in the first position, and which is covered by the valve body when said flow interrupter device is in the second or third position.

28. The lockout valve as in claim 24, wherein said strengthening rib comprises a reinforcement piece extending along a side edge of the flow interrupter device and interconnecting said stop flanges to provide structural reinforcement of said flow interrupter device.

29. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows fall fluid flow through a flow aperture in the flow interrupter device substantially unimpeded from the inlet passage to the outlet passage wherein said flow interrupter device further includes venting structure which vents fluid flow from the outlet passage to ambient when said flow interrupter device is in said first position, and said body carries a pair of O-seals, each of said O-seals bearing against a respective surface of the flow interrupter device and around a respective inlet and outlet passage, and said venting structure includes a plurality of vent channels formed in a surface of said flow interrupter device in a formation generally corresponding to the curvature of the O-seals and which bypass one of said seals on a downstream side of said flow interrupter device to allow downstream pressure in the valve to vent to atmosphere.

30. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows full fluid flow through a flow aperture in the flow interrupter device substantially unimpeded from the inlet passage to the outlet passage, and wherein said flow interrupter device further includes inlet and outlet passages located along a longitudinal axis in said body, and comprises a flat slide moveable in a transverse direction to the longitudinal axis of the body, and said flow interrupter device further includes a plurality of discretely-spaced channels formed in a downstream surface which fluidly interconnect the outlet passage with the atmosphere when said fluid interrupter device is in said first position.

31. A lockout valve, comprising a valve body with an upstream inlet passage and a downstream outlet passage which are fluidly interconnected; a flow interrupter device slidably received within said valve body and moveable between a first closed position which interrupts fluid flow from the inlet passage to the outlet passage, a second intermediate position which allows restricted fluid flow through a bleed aperture in the flow interrupter device from the inlet passage to the outlet passage, and a third open position which allows full fluid flow through a flow aperture in the flow interrupter device substantially unimpeded from the inlet passage to the outlet passage, wherein said flow interrupter device further includes inlet and outlet passages located along a longitudinal axis in said body, and said flow interrupter device comprises a flat slide moveable in a transverse direction to the longitudinal axis of the body, and wherein said flow interrupter device further includes a lock aperture extending transversely through the flow interrupter device which is accessible externally from the valve body when said flow interrupter device is in the first position, and which is covered by the valve body when said flow interrupter device is in the second or third position.

* * * * *